United States Patent
Feasel

(10) Patent No.: US 11,689,528 B2
(45) Date of Patent: Jun. 27, 2023

(54) TRANSPARENTLY USING ORIGIN ISOLATION TO PROTECT ACCESS TOKENS

(71) Applicant: ForgeRock, Inc., San Francisco, CA (US)

(72) Inventor: Jake Feasel, Vancouver, WA (US)

(73) Assignee: ForgeRock, Inc., San Francisco, CA (US)

( * ) Notice: Subject to any disclaimer, the term of this patent is extended or adjusted under 35 U.S.C. 154(b) by 739 days.

(21) Appl. No.: 16/569,574

(22) Filed: Sep. 12, 2019

(65) Prior Publication Data

US 2021/0084038 A1    Mar. 18, 2021

(51) Int. Cl.
*H04L 9/40* (2022.01)
*G06F 21/62* (2013.01)
*H04L 67/2876* (2022.01)
*G06F 9/54* (2006.01)

(52) U.S. Cl.
CPC ............ *H04L 63/0884* (2013.01); *G06F 9/54* (2013.01); *G06F 21/629* (2013.01); *G06F 21/6218* (2013.01); *H04L 67/2876* (2013.01)

(58) Field of Classification Search
CPC ... H04L 63/0884; H04L 67/2876; G06F 9/54; G06F 21/6218; G06F 21/629
See application file for complete search history.

(56) References Cited

U.S. PATENT DOCUMENTS

| | | | |
|---|---|---|---|
| 9,251,372 B1 * | 2/2016 | Lahoz | G06F 21/6245 |
| 9,398,017 B1 * | 7/2016 | Nizametdinov | G06Q 20/34 |
| 2015/0106620 A1 * | 4/2015 | Cabrera | H04L 63/0884 |
| | | | 713/168 |
| 2018/0077134 A1 * | 3/2018 | Beecham | H04L 67/28 |
| 2019/0228144 A1 * | 7/2019 | Kermes | H04L 63/0861 |

(Continued)

OTHER PUBLICATIONS

Jackson et al., "Protecting Browser State from Web Privacy Attacks", Copyright held by the Intl. World Wide Web Conference Committee. WWW 2006, May 23-26, 2006, Edinburgh, Scotland. ACM 1-59593-323-9/06/0005, pp. 1-8.

(Continued)

*Primary Examiner* — Huan V Doan
(74) *Attorney, Agent, or Firm* — Haynes Beffel & Wolfeld, LLP; Ernest J. Beffel, Jr.

(57) ABSTRACT

The disclosed technology teaches safely attaching an access token to a browser-based request from a first app loaded by a webpage, without exposing the token to malicious code loaded by the webpage, providing an identity proxy that transparently determines which network requests to relay and a secrets management proxy that provides access tokens transparently to the requests. The identity proxy intercepts an access request from the first app to the resource server and relays the request via the secrets management proxy, which forwards the request to the resource server with an access token, receives a response from the resource server and forwards the response to the identity proxy for return to the first app. The secrets management proxy is implemented in an iFrame that has isolated storage subject to a browser-enforced same origin policy that makes the isolated storage used by the iFrame inaccessible to malicious code on the webpage.

20 Claims, 5 Drawing Sheets

(56) References Cited

U.S. PATENT DOCUMENTS

2020/0028848 A1\* 1/2020 Gupta .................. G06F 21/105

OTHER PUBLICATIONS

Livshits, "Basic Web Security Model", CSE484/CSE584, course, slides, 2014, pp. 1-60.
Hardt, "The OAuth 2.0 Authorization Framework", Internet Egnineering Task Force, RFC 6749, Microsoft, ISSN: 2070-1721, Oct. 2012, pp. 1-77.
Chen et al, "App Isolation: Get the Security of Multiple Erasers with Just One", CCS'11, Oct. 17-21, 2011, Chicago, Illinois, USA. Copyright 2011, ACM 978-1-4503-0948-6/11/10, pp. 1-11.
Schenk et al, "Same-Origin Policy: Evaluation in Modern Browsers", usenix, Horst Gortz Institute for IT Security, Chair for Network and Data Security, Ruhr-University Bochum, https://www.usenix.org/conference/usenixsecurity17/technical-sessions/presentation/schwenk, paper included in the Proceedings of the 26th USENIX Security Symposium, Aug. 16-18, 2017, Vancouver, BC, Canada, ISBN 978-1-931971-40-9, pp. 1-17.
Polnik—"Using Service Worker as an auth relay", Mar. 13, 2018, ITNEXT, https://itnext.io/using-service-worker-as-an-auth-relay-5abc402878dd, 10 pages.
Jones et al, "The OAuth 2.0 Authorization Framework: Bearer Token Usage", Internet Engineering Task Force (IETF), Microsoft, RFC 6750, ISSN: 2070-1721, Oct. 2012, pp. 1-19.
"HTML5—IndexedDB", Aug. 26, 2019, tutorialspoint, https://www.tutorialspoint.com/html5/html5_indexeddb.htm#, pp. 1-6.
Feasel—"Support for XSS protection using origin isolation", jakefeasel/appAuthHelper@ceef164-GitHub, ForgeRock, Aug. 26, 2019, https://github.com/jakefeasel/appAuthHelper/commit/ceef164c1f75b5b265e32e029fca12036db9f018?diff=split, pp. 1-15.
Feasel—"js at master", appAuthHelper.js at master, ForgeRock, https://github.com/ForgeRock/appAuthHelper/blob/master/appAuthHelper.js, Aug. 26, 2019, pp. 1-7.
Feasel—"Identity Proxy Service Worker.js", appAuthHelper, ForgeRock, https:github.com/ForgeRock/appAuthHelper/blob/master/IdentityProxyServiceWorker.js, Aug. 26, 2019, pp. 1-2.
Feasel—"Identity Proxy XHR.js", appAuthHelper/IdentityProxyXHR.js at master, ForgeRock, https://github.com/ForgeRock/appAuthHelper/blob/master/IdentityProxyXHR.js, Aug. 26, 2019, pp. 1-3.
Sakimura et al, "Proof Key for Code Exchange by OAuth Public Clients", Internet Engineering Task Force (IETF), Google, RFC 7636, Sep. 2015, ISSN: 2070-1721, pp. 1-20.
Feasel—"Origin Isolation README.md", ForgeRock/appAuthHelper, https://github.com/jakefeasel/appAuthHelper/tree/originIsolation?files=1, Aug. 29, 2019, pp. 1-6.
Feasel—"Building an Identity Proxy for Your JavaScript Apps Using a Service Worker", https://developer.forgerock.com/docs/platform/how-tos/building-identity-proxy-your-javas..., ForgeRock, Jun. 26, 2019, 2 pages.

\* cited by examiner

TRANSPARENTLY USING ORIGIN ISOLATION TO PROTECT ACCESS TOKENS

PRIOR DISCLOSURES

Part of the technology disclosed in this application was previously disclosed in a posting entitled, "Building an Identity Proxy for Your JavaScript Apps Using a Service Worker", Jun. 26, 2019 by Jake Feasel <accessed at https://developer.forgerock.com/docs/platform/how-tos/building-identity-proxy-your-javascript-apps-using-service-worker>, which is hereby incorporated by reference and which will be submitted with an Information Disclosure Statement. This prior disclosure is identified in accordance with MPEP 2153.01(a) & 608.01(a) and 37 CFR 1.77(b)(6).

FIELD OF THE TECHNOLOGY DISCLOSED

The technology disclosed relates generally to transparently using origin isolation for securely making credentialed network requests on behalf of an application loaded by a webpage without the application having access to those credentials, thus preventing a malicious app loaded by the webpage from gaining access to the credentials. More specifically the disclosed technology safely uses access tokens in a single page application (SPA) without exposing the access tokens in the case of cross-site scripting (XSS) attacks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Single page applications (SPAs) are apps that work inside a browser and do not need page reloading during usage. Examples of SPAs that are in daily use include Google, Gmail, Maps, Facebook, Twitter and GitHub. Since single-page applications don't update the entire page but only required content, they significantly improve a website's speed, with most resources (HTML/CSS/Scripts) only loaded once throughout the lifespan of an application. Only data is transmitted back and forth. Web developers regularly implement SPAs as public-facing websites for organizations that want to restrict access to registered users only.

However, browser-based applications are subject to exploitation. Because they are public clients, they are incapable of maintaining the confidentiality of their credentials. Customer data and information created and stored in the cloud are attractive targets for attackers to steal. If compromised, credentials used by browser-based apps can be exploited to gain access to users' personally identifiable information (PII), health-related data, monetary transactions and credit card information etc. Consequently, a need exists for securing the credentials used by browser-based apps which access these sensitive services.

An opportunity arises to enable the safe use of access tokens in a browser-based app without exposing those access tokens to any malicious code that successfully exploits that app.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
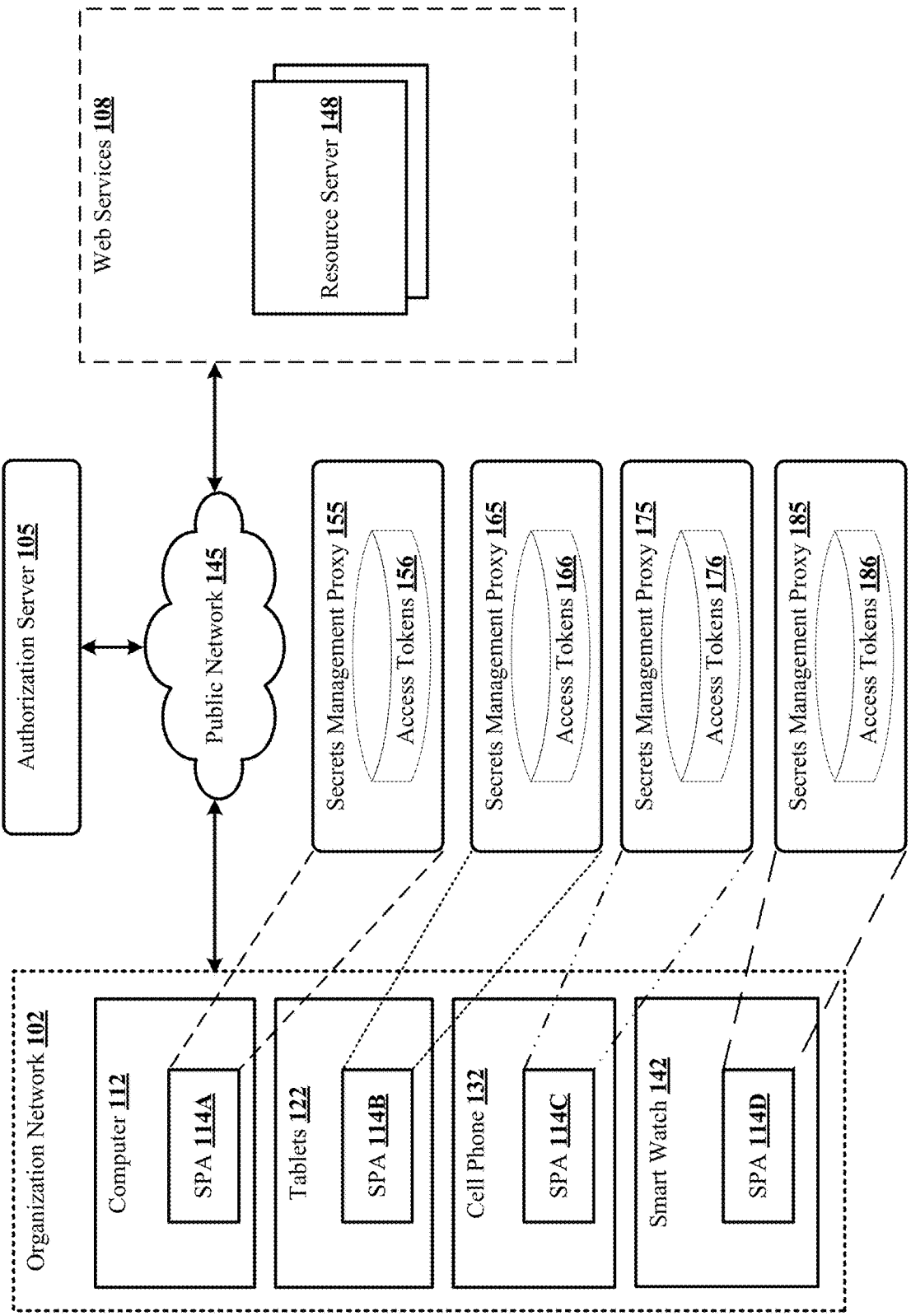
FIG. 1 shows an architectural level schematic of a system for enabling safe use of access tokens in a browser executing single page applications (SPAs) without risking exposure of the access token to a malicious app loaded by the SPAs.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Single page applications (SPAs) delivered in browsers need to be able to securely make credentialed network requests without having direct access to those credentials. By not having direct access to those credentials, a browser application would no longer be at risk of having credentials stolen as part of a cross-site script attack.

OAuth 2.0 is an authorization protocol, described by the OAuth 2.0 Authorization Framework (RFC 6749), that allows the approval of one application interacting with another on a user's behalf without giving away the user's password. OAuth uses access tokens as credentials to prove that the client is authorized to make requests to service providers. OAuth 2.0 offers constrained access to web services without a requirement to expose user credentials to the client applications. In general, OAuth 2.0 access tokens can be associated to either a client application or to a particular user of the client. However, SPAs are not capable of maintaining a confidential client secret, and so they cannot obtain client-specific tokens. The technology described below concerns user-specific access tokens. OAuth 2 resource server URLs are a specific type of network service that follows a standard means of authorization designed to require an access token as the credential included in the requests that are sent to them. The client making the request to a resource server URL is assumed to be legitimate based purely on the validity of the access token that it includes. For this reason, access token bearing clients must take every possible measure available to them to ensure that their access token is not exposed to an illegitimate audience.

Browser-based applications that are designed to make direct requests to a resource server URL must necessarily have the access token value available within the browser for those requests to be authorized. However, browser-based applications are subject to exploitation in ways that other types of access token-bearing clients are not.

A primary risk that is specific to browser-based applications is called cross-site scripting (XSS) attacks—a type of injection in which malicious scripts are injected into otherwise benign and trusted websites. XSS attacks occur when an attacker uses a web application to send malicious code, generally in the form of a browser side script, to a different and unsuspecting end user. The end user's browser has no way to know that the script should not be trusted and will execute the malicious script, which can access any access tokens, cookies or other sensitive information retained by the browser and used with that site. A cross-site scripting attack occurs when malicious software is injected into a browser-based application, usually due to a mistake made by the application's developers. Once injected, the malicious software has control over the user's browser, equivalent to the application that it was injected within. For example, if the exploited application has the option to directly read an access token value, then the malicious software injected from a cross-site scripting attack will also be able to read it, potentially transmitting it to the author of the malicious software. This would allow the author of the malicious software to make requests to a resource server URL, performing some form of illegitimate action.

The disclosed technology enables developers to mitigate the risk of cross-site scripting attacks by designing applications that do not require the ability to directly read an access token value, since malicious software injected into such an application will also be unable to directly read the access token.

Web application servers are identified by the server origin which is specified by the unique combination of protocol (such as https), host name and port used to serve the application. Origin isolation is a fundamental aspect of browser application security for ensuring that values saved by applications hosted within one origin are only readable by applications hosted within that same origin. The disclosed technology utilizes origin isolation to enable indirect usage of access token values.

Access tokens values can be saved and read by an application that is served from a different origin than the one used to host the main browser application. This separate application would be designed exclusively for the purpose of token management. As a result of this exclusive purpose, the separate application would not be susceptible to cross-site script attacks in the way that the wider-purpose main application would be.

Since the access token is stored by an application in a separate origin, the main browser application cannot read the access token value, and likewise, neither can any malicious software that might have been injected into the main application. However, the main application still needs to make requests to resource servers that include the access token. It can do this by making use of the postMessage function feature, which browsers support.

When an application developer utilizes the disclosed technology to embed a hidden frame within the main application, this hidden frame can load the alternative origin application. One frame can pass a message to another frame using the postMessage function, even if the frames are not hosted by the same origin. This disclosed technology includes a fundamental feature that allows the main application to make access token-bearing requests to resource servers without having the ability to directly read the access token. Instead, requests are initiated by sending a message, using the postMessage feature, to the alternative-origin application frame that includes an access management proxy that makes the token-bearing request to the resource server. The response from the resource server is then passed back to the main application as another message.

The disclosed technology also includes a mechanism for transparently intercepting network requests to resource servers made by the main application. Intercepted requests get forwarded to the alternative origin frame, and the responses from the frame are transparently presented back to the application. By utilizing this disclosed transparent interception mechanism, application developers can continue using the network request techniques that they typically use when developing single page applications (SPA), with no need to alter the design of the application substantially in order to directly make postMessage requests.

The disclosed technology utilizes well-defined parts of the OAuth 2 standard along with a transparent interception mechanism to enable developers to design browser-based applications that readily and securely make credentialed network requests without having direct access to those credentials. The SPAs designed utilizing the disclosed technology have no direct access to the token values, so the access tokens are secure and not at risk of being stolen as part of a cross-site scripting (XSS) attack on the SPA. This protection allows purely-browser-based applications to manage non-cookie-based credentials, such as OAuth 2 access tokens, as securely as hybrid browser/server applications which rely on secure cookies.

The next section describes an architecture for safely using an access token in a browser on behalf of a first app loaded by a webpage without exposing the access token to a malicious app loaded by the webpage.

Architecture

FIG. 1 shows an architectural level schematic of a system 100 for safely using an access token in a browser on behalf of a first app loaded by a webpage without exposing the access token to a malicious app loaded by the webpage. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes organization network 102 with computer 112 that includes browser-based single page application (SPA) 114A, tablet 122 that includes SPA 114B, cell phone 132 that includes SPA 114C and smart watch 142 that includes 114D. While a single SPA can execute in multiple different devices, four distinct SPAs are depicted in system. Browser-based applications can also be delivered on additional devices not mentioned here. Also, more than one SPA can be delivered on a single device, via different web pages. Each SPA instance includes a secret management proxy. FIG. 1 shows an example in which SPA 114A includes secrets management proxy instance 155 with access tokens 165, SPA 114B includes secrets management proxy instance 165 with access tokens 166, SPA 114C includes secrets management proxy instance 175 with access tokens 176 and SPA 114D includes secrets management proxy instance 185 with access tokens 186.

System 100 also includes authorization server 105, web services 108 with resource server 148 and public network 145. Authorization server 105 is a trusted authority that responds to requests for access, responding with access tokens. System 100 can include multiple browser-based applications and multiple resource servers. Browser-based SPAs 114A-114D communicate with authorization server 105 and web services 108 via posted messages. An access token 156, 166, 176, 186 is a sensitive value that represents an assertion from authorization server 105. The access token represents the authorization of a specific application to access specific parts of a user's data. Access tokens must be kept confidential in transit and in storage.

Continuing with the description of system 100, each secrets management proxy 155, 165, 175, 185 acts as an access tokens manager for a specific SPA. Secrets management proxy 155, 165, 175, 185 obtains access tokens from authorization server 105 and stores the access tokens in isolated memory during operation of the secrets management proxy within the browser invocation. Secrets management proxy 155, 165, 175, 185 also makes the access token-bearing request to resource server 148. Resource server 148 handles access-token-authenticated requests from a browser-based app.

In the interconnection of the elements of system 100, public network 145 couples computer 112, tablet 122, cell phone 132, smart watch 142, authorization server 105 and resource server 148 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Figure 2:
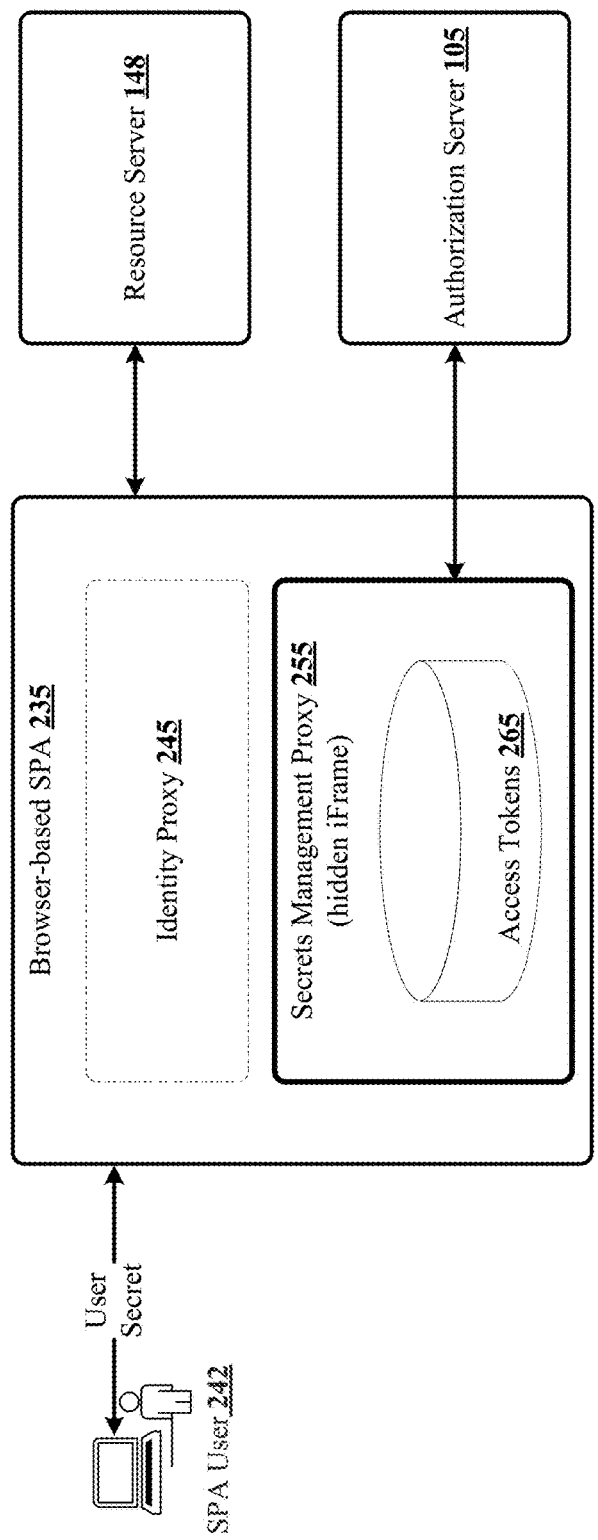
FIG. 2 shows a simplified block diagram of components for transparently using origin isolation for securely making credentialed network requests without the application having access to read those credentials, thus also preventing a malicious app loaded by the webpage from being able to read the credentials.

FIG. 2 shows a simplified block diagram 200 of components for transparently using origin isolation for securely making credentialed network requests on behalf of an application loaded by a webpage without the application having access to those credentials, thus preventing a malicious app loaded by the webpage from gaining access to the access tokens, which could be used to access sensitive user information. SPA user 242 logs in to a browser-based SPA 235, which includes an app authentication helper with configuration information for the SPA that includes the base endpoints that require authorization. Configuration data for a SPA includes at least base URLs, aka RS endpoints, for which access token management services are to be provided, specific to the application, such as Google, ForgeRock and Facebook. Configuration data also specifies the scopes, aka the specific actions the SPA can be allowed to do on a user's behalf. When the app requests permission to access a resource through the authorization server, it uses the scope to specify what access it needs, and the authorization server uses the scope to respond with the access that was granted, if the granted access was different from what was requested. In one example, the app uses the scope to verify the identity of a user and get basic profile information about the user, such as their email or picture.

Continuing the description of the block diagram 200, each SPA instance includes an identity proxy 245 and a security management proxy 255. Identity proxy 245 transparently intercepts requests, receiving any network request issued by the SPA, and reviewing all the requests from the SPA to resource server 148, with respect to the configuration specification for the SPA. Identity proxy 245 reroutes requests destined for resource server 148 that correspond to configuration data for the SPA to secrets management proxy 255, which handles access tokens. Identity proxy 245 also reroutes request responses from resource server 148 destined for the browser-based SPA. In one implementation, session storage is used to pass the configuration data from identity proxy 245 to secrets management proxy 255.

Continuing the description of the block diagram of FIG. 2, secrets management proxy 255 is implemented in an iFrame, which has a different origin than the browser-based app, to ensure that the access tokens are not accessible to malicious apps that could be injected into the SPA. Further, access tokens are stored for the SPA in access tokens data store 265. Access tokens can be revoked upon logout from a SPA; and the tokens survive browser refreshes as well as times when SPA user 242 leaves and returns to browser-based SPA 235. One implementation of access tokens data store 265 uses indexes, via IndexedDB, to enable high-performance searches of access token data in a key-value pair not-only-SQL structure. IndexedDB is one example for implementing asynchronously storing access tokens via a low-level API for client-side storage of significant amounts of structured data. Another implementation could utilize LocalStorage, web storage that allows JavaScript websites and apps to store and access data in the browser with no expiration date, so that the stored data persists even after the browser window has been closed. A different asynchronous storing process can also be implemented such as dynamic storage.

Further continuing the description of the block diagram of FIG. 2, two disclosed techniques for implementing identity proxy 245 are described next. For more modern browsers, identity proxy 245 is implemented as a service worker, in a separate JavaScript thread which exists in the browser apart from the primary application thread. The service worker is a proxy layer that exists in the browser between the main application code and the network endpoints which it calls. Identity proxy 245 has access to intercept and potentially modify all network traffic generated by the SPA in this implementation. The browser passes any network request issued by SPA 235 to identity proxy 245, giving the service worker an opportunity to alter both the requests from the browser-based app and the responses that are routed to the browser-based app. The identity proxy 245 service worker uses postMessage to the alternate-origin frame of secrets management proxy 255, to offer secure, transparent access token usage. When using a "redirect uri" function hosted on a domain other than the one used by the application code, the access token will be inaccessible to the application code, due to the origin isolation behavior. Network requests to resource server endpoints are handled by identity proxy 245, which will use message passing to redirect the request to secrets management proxy 255 iframe hosted in the same origin as the redirect uri function. In the case of XSS attack, the malicious code will be unable to read the access token.

A second disclosed technique for implementing identity proxy 245 is via the XMLHttpRequest object, for browsers which do not support service workers. Disclosed AppAuthHelper functionally includes detecting whether service workers are supported in the browser and if service workers are not supported will customize the XMLHttpRequest object, which results in the same identity proxy behavior as described for the service worker. The XMLHttpRequest object methods transfer data between SPA 235 and resource server 148, with retrieval of data from XHR for the purpose of continually modifying the loaded web page. The behavior of the XMLHttpRequest object is customized using JavaScript to override its default methods, so that network requests to resource server 148 result in postMessage calls to the alternate-origin frame of secrets management proxy 255, which also achieves secure, transparent access token usage.

Figure 3:
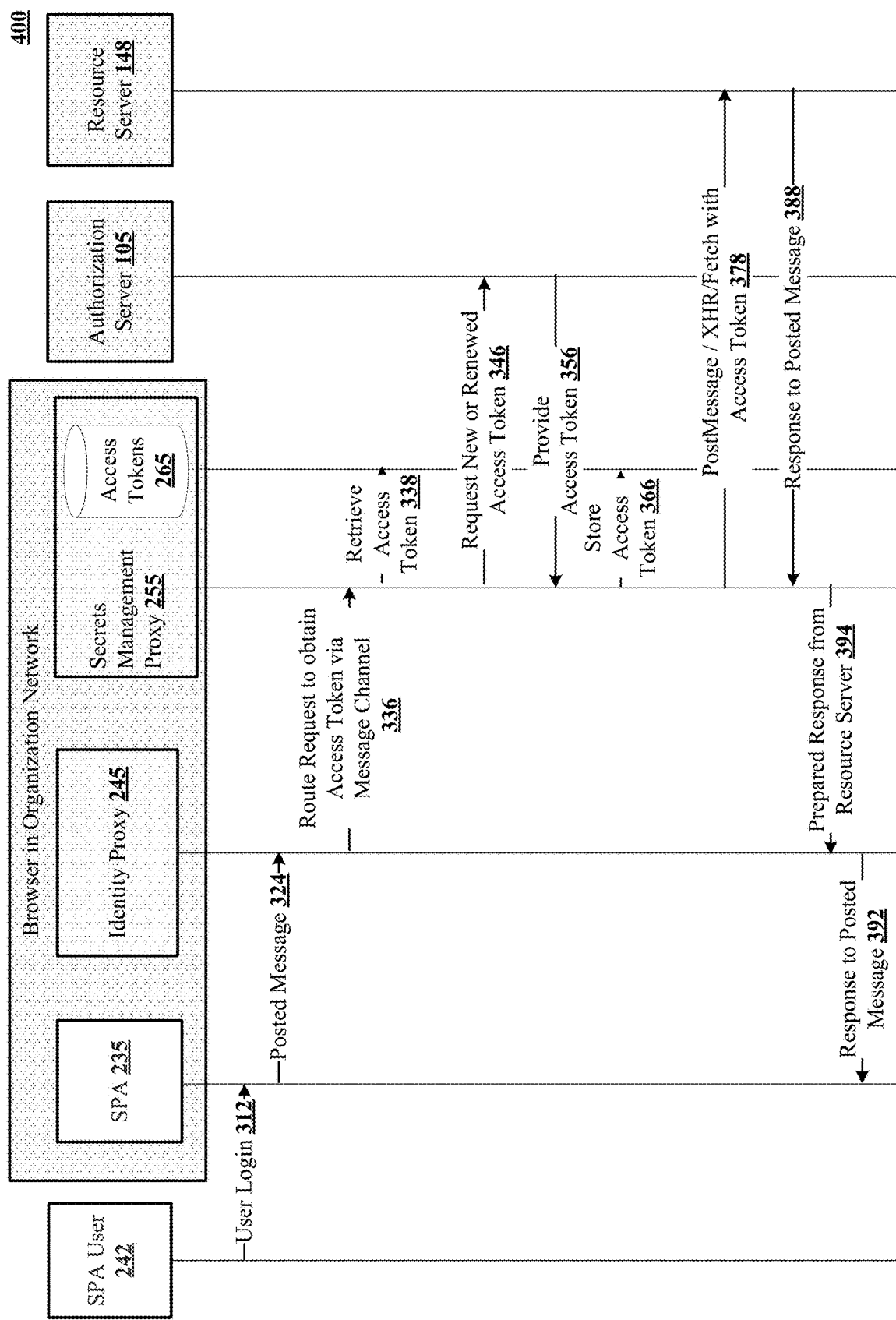
FIG. 3 shows a message diagram for safely using an access token in a browser on behalf of an app loaded by a webpage without exposing the access token to a malicious app loaded by the webpage.

FIG. 3 shows a message diagram 300 for safely using an access token in a browser on behalf of a first app loaded by a webpage without exposing the access token to a malicious app loaded by the webpage. Message diagram 300 shows functionality and interactions of the blocks described relative to block diagram 200. After SPA user 242 of a single page app 235 logs in 312, SPA 235 posts a message 324 destined for resource server 148. Identity proxy 245 reviews the incoming message 324 and determines whether to relay the request to secrets management proxy 255 to obtain an access token for the user via message channel 336. Secrets management proxy 255 attempts to retrieve an existing access token 338 from access tokens 265. If no active access token is available in the access tokens storage, then secrets management proxy 255 requests a new or renewed access token 346 from authorization server 105. Authorization server 105 provides an access token 356 to secrets management proxy 255.

Continuing with the description of workflow diagram 300, secrets management proxy 255 stores the new or renewed access token 366 received from authorization server 105. Secrets management proxy 255 uses the access token obtained to post a message with access token 378 to resource server 148. Resource server 148 sends a response to the posted message 388 and secrets management proxy 255 prepares and sends the response 394 to identity proxy 245 which sends the prepared response to the posted message 392 from resource server 148 to SPA 235, without sharing the access tokens utilized to access resource server 148. In some implementations, a response from the resource server prepared by secrets management proxy 255 can be posted directly to SPA 235.

Workflow

Figure 4:
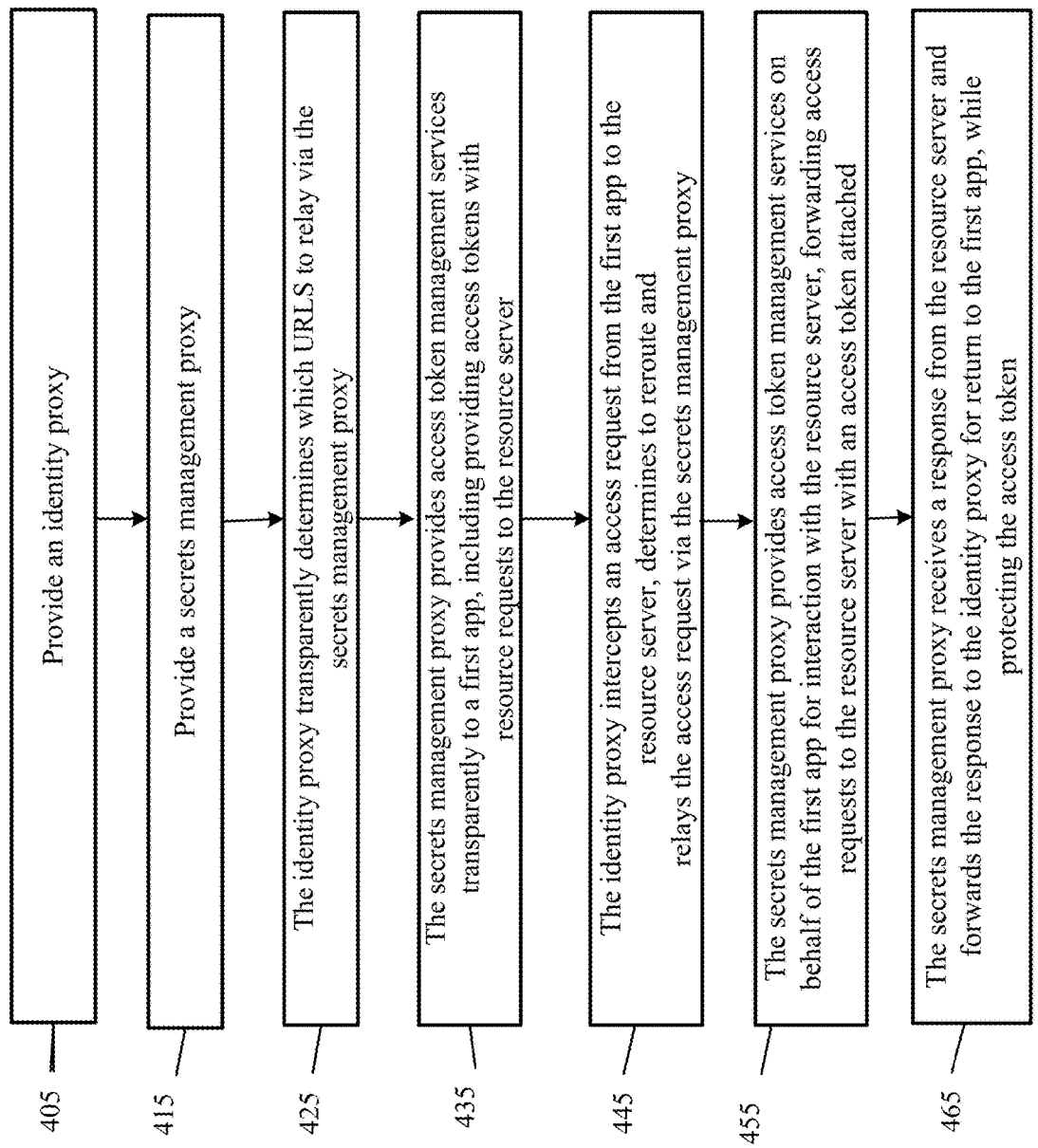
FIG. 4 shows a representative method of safely using an access token in a browser on behalf of an app loaded by a webpage without exposing the access token to a malicious app loaded by the webpage.

FIG. 4 shows a representative method of safely using an access token in a browser on behalf of a first app loaded by a webpage without exposing the access token to a malicious app loaded by the webpage. Flowchart 400 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 4. Multiple actions can be combined in some implementations.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 4 begins with action 405 providing an identity proxy and action 415 providing a secrets management proxy.

Process 400 continues at action 425 with the identity proxy transparently determining which URLS to relay via the secrets management proxy.

Action 435 includes the secrets management proxy providing access token management services transparently to the first app when communicating with the resource server, including providing access tokens with resource requests to the resource server.

Action 445 includes the identity proxy intercepting an access request from the first app to the resource server, determining to reroute, and relaying the access request via the secrets management proxy.

Process 400 further continues at action 455, where the secrets management proxy provides access token management services on behalf of the first app for interaction with the resource server and forwarding at least one access request to the resource server with an access token attached.

At action 465, the process includes the secrets management proxy receiving a response from the resource server and forwarding the response to the identity proxy for return to the first app.

Other implementations may perform the actions in different orders and/or with different, fewer or additional actions than those illustrated in FIG. 4. Multiple actions can be combined in some implementations. For convenience, this flowchart is described with reference to the system that carries out a method. The system is not necessarily part of the method.

Computer System

Figure 5:
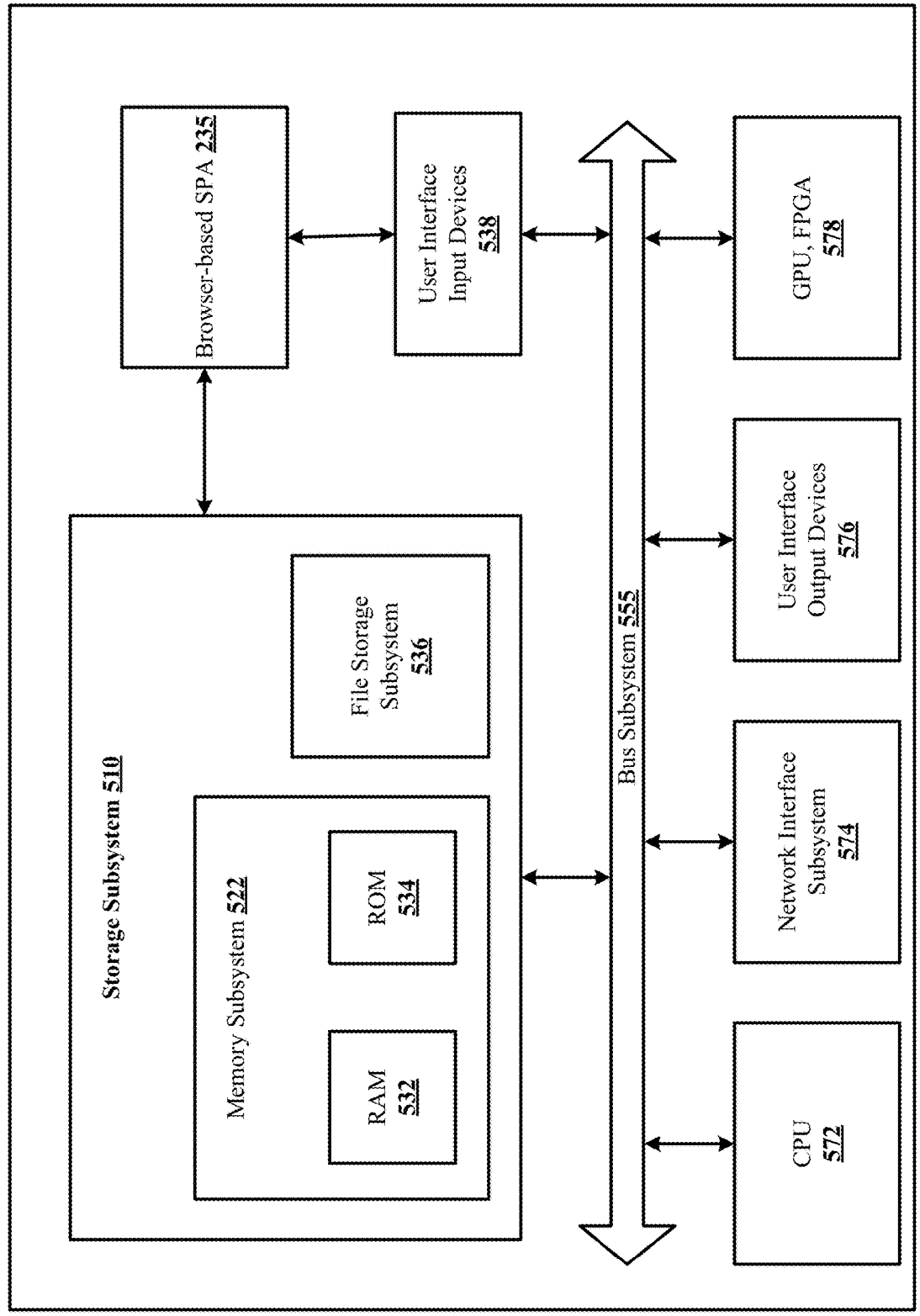
FIG. 5 is a simplified block diagram of a computer system that can be used for transparently using origin isolation for securely making credentialed network requests on behalf of an application loaded by a webpage without the application having access to those credentials, according to one embodiment of the disclosed technology.

FIG. 5 is a simplified block diagram of a computer system 500 that can be used for safely using an access token in a browser on behalf of a first app loaded by a webpage without exposing the access token to a malicious app loaded by the webpage implemented on a cloud-based computing service. Computer system 500 includes at least one central processing unit (CPU) 572 that communicates with a number of peripheral devices via bus subsystem 555, and browser-based SPA 235 for providing network security services described herein. These peripheral devices can include a storage subsystem 510 including, for example, memory devices and a file storage subsystem 536, user interface input devices 538, user interface output devices 576, and a network interface subsystem 574. The input and output devices allow user interaction with computer system 500. Network interface subsystem 574 provides an interface to outside networks, including an interface to corresponding interface devices in other computer systems. Browser-based SPA 235 of FIG. 2 is implemented with identity proxy 245 and with secrets management proxy 255 in an iFrame in the browser and is communicably linked to the storage subsystem 510 and the user interface input devices 538.

User interface input devices 538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 500.

User interface output devices 576 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 500 to the user or to another machine or computer system.

Storage subsystem 510 stores programming and data constructs that provide the functionality of some or all of the modules and methods described herein. Subsystem 578 can be graphics processing units (GPUs) or field-programmable gate arrays (FPGAs).

Memory subsystem 522 used in the storage subsystem 510 can include a number of memories including a main random-access memory (RAM) 532 for storage of instructions and data during program execution and a read only memory (ROM) 534 in which fixed instructions are stored. A file storage subsystem 536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 536 in the storage subsystem 510, or in other machines accessible by the processor.

Bus subsystem 555 provides a mechanism for letting the various components and subsystems of computer system 500 communicate with each other as intended. Although bus subsystem 555 is shown schematically as a single bus, alternative implementations of the bus subsystem can use multiple busses.

Computer system 500 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 500 depicted in FIG. 5 is intended only as a specific example for purposes of illustrating the preferred embodiments of the present invention. Many other configurations of computer system 500 are possible having more or fewer components than the computer system depicted in FIG. 5.

Particular Implementations

Some implementations and features for safely using an access token in a browser on behalf of a first app loaded by a webpage without exposing the access token to a malicious app loaded by the webpage are described in the following discussion.

One implementation discloses a computer-implemented method of safely using an access token in a browser on behalf of a first app loaded by a webpage without exposing the access token to a malicious app loaded by the webpage includes initializing an identity proxy and a secrets management proxy, in which the identity proxy transparently determines which network requests to forward to via the secrets management proxy and the secrets management proxy provides access token management services transparently to the requests when communicating with the resource server. The method also includes the first app sending an access request to the resource server, and the identity proxy intercepting the access request, determining to reroute, and relaying the access request via the secrets management proxy. The method further includes the secrets management proxy providing access token management services on behalf of the first app for interaction with the resource server and forwarding at least one access request to the resource server with an access token attached and the secrets management proxy receiving a response from the resource server and forwarding the response to the first app.

Another implementation discloses a computer-implemented method of safely attaching an access token to a browser-based request to a resource server, made on behalf of a first app loaded by a webpage, without exposing the access token to a malicious app loaded by the webpage, including providing an identity proxy and a secrets management proxy. The disclosed identity proxy transparently determines which requests to relay via the secrets management proxy and the secrets management proxy provides access token management services transparently to the first app when communicating with the resource server, including providing access tokens with resource requests to the resource server. The method also includes the identity proxy intercepting an access request from the first app to the resource server, determining to reroute, and relaying the access request via the secrets management proxy and the secrets management proxy providing access token management services on behalf of the first app for interaction with the resource server and forwarding at least one access request to the resource server with an access token attached. The disclosed method further includes the secrets management proxy receiving a response from the resource server and forwarding the response to the identity proxy for return to the first app.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of the method further include passing configuration data that includes data for identifying the resource server to the secrets management proxy. For some implementations of the disclosed method, obtaining access tokens by the secrets management proxy further includes requesting and receiving the access tokens from an authorization server.

Implementations of the disclosed method include the secrets management proxy implemented in an iFrame that has isolated storage subject to a browser-enforced same origin policy that makes the isolated storage used by the iFrame inaccessible to malicious code on the webpage but not within the iFrame. The disclosed method further includes the secrets management proxy storing the access tokens in the isolated storage used by the iFrame. In some implementations of the disclosed method, obtaining access tokens by the secrets management proxy further includes retrieving the access token from the isolated storage used by the iFrame, with the isolated storage used by the iFrame accessed via one of an IndexedDB API and a localStorage API provided by the browser. In another implementation, the isolated storage used by the iFrame is in dynamic memory.

Disclosed implementations of the method include the identity proxy using one of a service worker API and an XMLHttpRequest object customization.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of safely attaching an access token to a browser-based request to a resource server, made on behalf of a first app loaded by a webpage, without exposing the access token to a malicious app loaded by the webpage with the first app, including:
   providing an identity proxy and a secrets management proxy running in an iFrame on the browser that is running the first app, wherein
      the identity proxy transparently determines which network requests to relay via the secrets management proxy; and
      the secrets management proxy provides access token management services transparently to the request when communicating with the resource server, including providing access tokens with resource requests to the resource server;
   the identity proxy intercepting an access request from the first app to the resource server, determining to reroute, and relaying the access request via the secrets management proxy;
   the secrets management proxy providing the access token management services on behalf of the request for interaction with the resource server and forwarding the request to the resource server with the access token attached; and
   the secrets management proxy receiving a response from the resource server and forwarding the response to the identity proxy for return to the first app, without providing the access token to the first app or the malicious app.

2. The computer-implemented method of claim 1, further including passing configuration data that includes data for identifying the resource server to the secrets management proxy.

3. The computer-implemented method of claim 1, wherein obtaining the access tokens by the secrets management proxy further includes requesting and receiving the access tokens from an authorization server.

4. The computer-implemented method of claim 1, wherein the secrets management proxy is implemented in an iFrame that has isolated storage subject to a browser-enforced same origin policy that makes the isolated storage used by the iFrame inaccessible to malicious code on the webpage but not within the iFrame.

5. The computer-implemented method of claim 4, further including the secrets management proxy storing the access tokens in the isolated storage used by the iFrame.

6. The computer-implemented method of claim 4, wherein obtaining the access tokens by the secrets management proxy further includes retrieving the access token from the isolated storage used by the iFrame.

7. The computer-implemented method of claim 4, wherein the isolated storage used by the iFrame is accessed via one of an IndexedDB API and a local Storage API provided by the browser.

8. The computer-implemented method of claim 4, wherein the isolated storage used by the iFrame is in dynamic memory.

9. The computer-implemented method of claim 1, wherein the identity proxy uses one of a service worker API and an XMLHttpRequest object customization.

10. A tangible non-transitory computer readable storage media, including program instructions loaded into memory that, when executed on processors cause the processors to implement a method of safely attaching an access token to a browser-based request to a resource server, made on behalf of a first app loaded by a webpage, without exposing the access token to a malicious app loaded by the webpage with the first app, the method including:
    providing an identity proxy and a secrets management proxy running in an iFrame on the browser that is running the first app, wherein
       the identity proxy transparently determines which network requests to relay via the secrets management proxy; and
       the secrets management proxy provides access token management services transparently to the request when communicating with the resource server, including providing access tokens to requests to the resource server;
    the identity proxy intercepting a request from the first app to the resource server, determining to reroute, and relaying the request via the secrets management proxy;
    the secrets management proxy providing the access token management services on behalf of the first app for interaction with the resource server and forwarding the request to the resource server with the access token attached; and
    the secrets management proxy receiving a response from the resource server and forwarding the response to the identity proxy for return to the first app, without providing the access token to the first app or the malicious app.

11. The tangible non-transitory computer readable storage media of claim 10, further including passing configuration data that includes data for identifying the resource server to the secrets management proxy.

12. The tangible non-transitory computer readable storage media of claim 10, wherein obtaining access tokens by the secrets management proxy further includes requesting and receiving the access tokens from an authorization server.

13. The tangible non-transitory computer readable storage media of claim 10, wherein the secrets management proxy is implemented in an iFrame that has isolated storage subject to a browser-enforced same origin policy that makes the isolated storage used by the iFrame inaccessible to malicious code on the webpage but not within the iFrame.

14. The tangible non-transitory computer readable storage media of claim 13, further including the secrets management proxy storing the access tokens in the isolated storage used by the iFrame.

15. The tangible non-transitory computer readable storage media of claim 13, wherein obtaining access tokens by the secrets management proxy further includes retrieving the access token from the isolated storage used by the iFrame.

16. The tangible non-transitory computer readable storage media of claim 13, wherein the isolated storage used by the iFrame is accessed via one of an IndexedDB API, a local Storage API provided by the browser and dynamic memory.

17. The tangible non-transitory computer readable storage media of claim 10, wherein the identity proxy uses one of a service worker API and an XMLHttpRequest object customization.

18. A system comprising:
a memory storing program instructions; and
one or more processors coupled to the memory, wherein when the one more processors execute the program instructions, causing the one or more processors to implement a method of safely attaching an access token to a browser-based request to a resource server, made on behalf of a first app loaded by a webpage, without exposing the access token to a malicious app loaded by the webpage with the first app, the method including:
providing an identity proxy and a secrets management proxy running in an iFrame on the browser that is running the first app, wherein the identity proxy transparently determines which network requests to relay via the secrets management proxy; and
the secrets management proxy provides access token management services transparently to the request when communicating with the resource server, including providing access tokens to requests to the resource server;
the identity proxy intercepting a request from the first app to the resource server, determining to reroute, and relaying the request via the secrets management proxy;
the secrets management proxy providing the access token management services on behalf of the first app for interaction with the resource server and forwarding the request to the resource server with the access token attached; and
the secrets management proxy receiving a response from the resource server and forwarding the response to the identity proxy for return to the first app, without providing the access token to the first app or the malicious app.

19. The system of claim 18, wherein the program instructions extend the method including passing configuration data that includes data for identifying the resource server to the secrets management proxy.

20. The system of claim 18, wherein the secrets management proxy is implemented in an iFrame that has isolated storage subject to a browser-enforced same origin policy that makes the isolated storage used by the iFrame inaccessible to malicious code on the webpage but not within the iFrame.

* * * * *